UNITED STATES PATENT OFFICE.

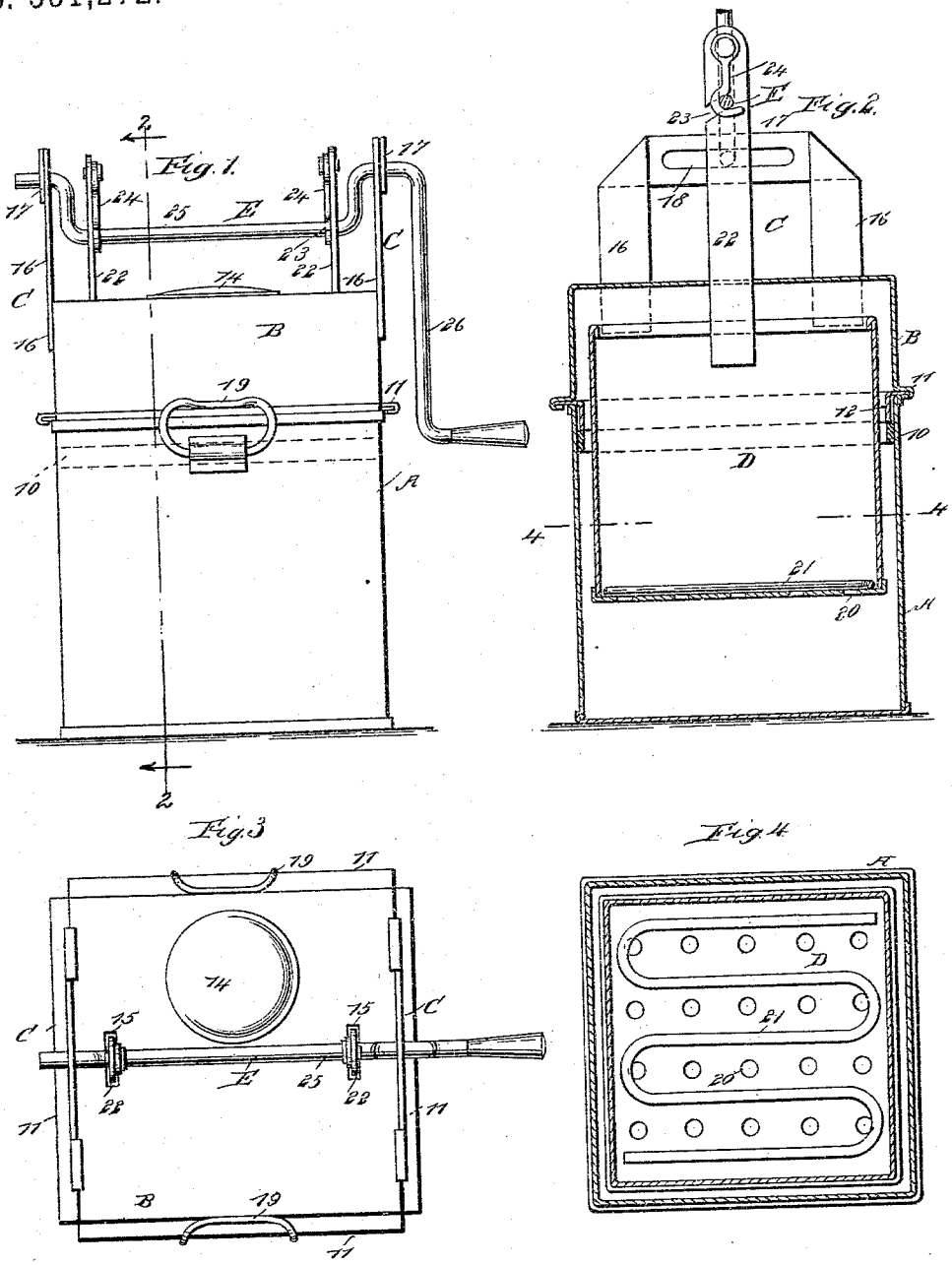

ALBERT J. FINLAY AND CHARLES WILSON, OF SILVERTON, OREGON.

DISH-CLEANER.

SPECIFICATION forming part of Letters Patent No. 551,272, dated December 10, 1895.

Application filed April 19, 1895. Serial No. 546,334. (No model.)

*To all whom it may concern:*

Be it known that we, ALBERT J. FINLAY and CHARLES WILSON, of Silverton, in the county of Marion and State of Oregon, have invented a new and Improved Dish-Washer, of which the following is a full, clear, and exact description.

Our invention relates to an improvement in dish-washers, and it has for its object to provide a machine which may be placed upon a stove and the water therein heated and kept heated; and to provide further a basket and a means for reciprocating the said basket within a suitable receptacle adapted to contain water or a cleansing compound, the receptacle and basket being so constructed that the dishes in the former will be subjected to the action of the water in the latter upon the downward stroke of the basket, the upward stroke serving to drain the water from the dishes.

Another object of the invention is to provide a means whereby the cover of the receptacle may be readily removed, or the receptacle filled without the removal of the cover, and whereby also a crank-shaft, by means of which the basket is manipulated, may be utilized as a handle for the basket.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a side elevation of the dish-washer. Fig. 2 is a vertical section thereof on the line 2 2 of Fig. 1. Fig. 3 is a plan view, and Fig. 4 is a horizontal section taken substantially on the line 4 4 of Fig. 2.

In carrying out the invention a receptacle A is provided, which may be made of any desired material and is usually of rectangular shape, and the said receptacle may be used alone as an ordinary dish-pan when required. The receptacle is provided near the top with an interior band or rib 10, and a cover B is adapted to cover the top portion of the receptacle, the said cover having a flange at its lower edge, which flange is angular or L-shaped in cross-section, embracing an outwardly-extending horizontal member 11 and a vertical member 12, adapted to extend downward within the receptacle and rest upon the rib or band 10 thereof, thus preventing the escape of water from the receptacle in the event the water is agitated.

The cover B is provided with an opening normally closed by a removable cap 14, through which water may be introduced into the receptacle without removing the cover; and two slots 15 are made in the top of the cover, one at each side of the center, as shown in Fig. 3, and upon the side of the cover adjacent to the slots standards C are firmly secured. Each of the standards embraces preferably two vertical members 16, and a connecting horizontal member 17, the latter member having a longitudinal slot 18 made therein, as shown in Fig. 2; and the cover is held down upon the receptacle A through the medium of handles 19 attached to opposite sides of the receptacle, the said handles being of spring material, and they are adapted to be sprung over the horizontal outwardly-extending member 11 of the cover-flange, as shown in Figs. 1 and 3.

A basket D is held to reciprocate in the receptacle A within the cover B. This basket, as is best shown in Figs. 2 and 4, is of corresponding shape to the receptacle, being however narrower and of less height, so that a space will be provided between the sides of the basket and the sides of both the receptacle and its cover.

The bottom of the basket is provided with a number of apertures 20, and a grate 21 is preferably loosely laid on the inner face of the said basket-bottom. The basket is open at the top, and at opposite sides of the basket at its upper end an upright 22 is firmly secured, said uprights being made to pass through the openings 15 in the cover B. Each upright near its upper end is provided with an upwardly-inclined slot 23, and likewise with a hook 24, or the equivalent thereof, the hook being adapted to drop over the slot, as shown in Fig. 2.

A crank-shaft E is utilized for vertically reciprocating the basket. The said shaft is journaled at its ends in the slots 18 of the standards C of the cover, and the crank-arm 25 of the said shaft, as shown in Fig. 1, extends practically from one standard C to the other, and the crank-shaft at one of its ends has a handle 26 attached thereto, or formed integral therewith.

The crank-arm 25 of the crank-shaft is entered in the slots 23 of the basket-uprights, and the hooks 24 are then passed over the slots and made to receive the shaft. The water having been placed in the receptacle A and the dishes to be washed placed in the basket, the dishes will be thoroughly cleansed by simply revolving the crank-shaft E, since at each downward stroke of the basket the water will be forced up through the apertures 20 in its bottom, while at the same time the water forced up between the sides of the basket and the sides of the receptacle will be directed over the top of and into the basket through the medium of the rib or band 10 within the receptacle, this action taking place at or about the time that the top of the basket passes the said rib or band 10, and upon the upward movement of the basket the water will drain from the dishes through the openings in the bottom of the basket.

It is evident that the basket may be carried by hand, when desired, using the shaft as a handle, by simply lifting the cover off from the receptacle; or the cover may be entirely disconnected from the basket by disconnecting the basket-uprights and sliding the shaft to one side, whereupon the cover may be lifted up free from the said basket-uprights.

Having thus described our invention, we claim as new and desire to secure by Letters Patent—

1. In a dish washer, the combination, with a receptacle, a cover therefor, and standards mounted upon the cover and having elongated bearings therein, of a basket having a portion of its surface apertured and adapted to receive dishes, the basket being held to move loosely in the receptacle and cover, uprights projected from the basket through the cover, and having outwardly opening inclined slots, a crank shaft mounted in the elongated bearings of the standards and engaging in the slots of the aforesaid uprights, and the hooks on the uprights to retain the crank shaft in place, as and for the purpose specified.

2. In a dish washer, the combination, with a receptacle, a cover therefor, and standards mounted upon the cover and having elongated bearings therein, of a basket having an open top and openings in its bottom portion, uprights attached to the sides of the basket and extending upward through the cover, the basket having free vertical movement within the receptacle and its cover, a crank shaft mounted in the said elongated bearings, being adapted to enter the openings in the said uprights, and locking and releasing devices carried by the uprights and adapted for engagement with the crank shaft, substantially as and for the purpose set forth.

ALBERT J. FINLAY.
CHARLES WILSON.

Witnesses:
MATTIE WILSON,
EMMA HANSON.